(12) United States Patent
Ogino et al.

(10) Patent No.: US 11,698,132 B2
(45) Date of Patent: Jul. 11, 2023

(54) SHIFT DEVICE

(71) Applicant: AISIN CORPORATION, Kariya (JP)

(72) Inventors: Atsuto Ogino, Kariya (JP); Kota Ishikawa, Kariya (JP); Yutaka Uchida, Kariya (JP); Kentaro Baba, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 17/666,883

(22) Filed: Feb. 8, 2022

(65) Prior Publication Data

US 2022/0307592 A1 Sep. 29, 2022

(30) Foreign Application Priority Data

Mar. 26, 2021 (JP) ................................. 2021-053673

(51) Int. Cl.
| | |
|---|---|
| *F16H 61/00* | (2006.01) |
| *F16H 61/28* | (2006.01) |
| *F16H 61/32* | (2006.01) |
| *F16H 63/34* | (2006.01) |
| *F16H 59/08* | (2006.01) |
| *F16H 59/04* | (2006.01) |

(52) U.S. Cl.
CPC ....... *F16H 61/2807* (2013.01); *F16H 59/041* (2013.01); *F16H 59/08* (2013.01); *F16H 61/32* (2013.01); *F16H 63/3466* (2013.01); *F16H 2061/283* (2013.01); *F16H 2061/326* (2013.01)

(58) Field of Classification Search
CPC .... F16H 61/2807; F16H 59/041; F16H 59/08; F16H 61/32; F16H 63/3466; F16H 2061/283; F16H 2061/326
See application file for complete search history.

(56) References Cited

U.S. PATENT DOCUMENTS

| | | | |
|---|---|---|---|
| 11,143,290 B2 * | 10/2021 | Kim ...................... | F16H 59/105 |
| 2006/0207373 A1 | 9/2006 | Amamiya et al. | |
| 2008/0168853 A1 | 7/2008 | Amamiya et al. | |
| 2008/0210033 A1 | 9/2008 | Amamiya et al. | |
| 2016/0102761 A1 | 4/2016 | Kuwahara et al. | |

(Continued)

FOREIGN PATENT DOCUMENTS

| | | |
|---|---|---|
| JP | 2004-308752 A | 11/2004 |
| JP | 2016-075364 A | 5/2016 |
| JP | 2018-040426 A | 3/2018 |

*Primary Examiner* — Victor L MacArthur
(74) *Attorney, Agent, or Firm* — Oblon, McClelland, Maier & Neustadt, L.L.P.

(57) ABSTRACT

A shift device includes: a shift switching member including valley portions corresponding to shift positions; a motor including a rotor and a stator and configured to drive the shift switching member; a first drive system including a first control unit configured to control a voltage for driving the motor; a second drive system provided separately from the first drive system and including a second control unit configured to control a voltage for driving the motor; and a positioning member configured to establish the shift positions in a state in which the positioning member is fitted into any one of the valley portions of the shift switching member. The shift device acquires the shift positions when the motor is driven by the voltage output from one of the first and second drive systems to move the positioning member such that the positioning member continuously passes through the valley portions.

6 Claims, 10 Drawing Sheets

(56) References Cited

U.S. PATENT DOCUMENTS

2018/0065618 A1      3/2018  Nishimine
2020/0370644 A1*    11/2020  Sakaguchi ............. F16H 61/12
2021/0071757 A1*     3/2021  Ogino ................. F16H 61/0204

* cited by examiner

DRIVING FORCE TRANSMITTABLE STATE

DRIVING FORCE NON-TRANSMISSION STATE

EXAMPLE OF ENERGIZATION PATTERN

SHIFT DEVICE

CROSS REFERENCE TO RELATED APPLICATIONS

This application is based on and claims priority under 35 U.S.C. § 119 to Japanese Patent Application 2021-053673, filed on Mar. 26, 2021, the entire content of which is incorporated herein by reference.

TECHNICAL FIELD

This disclosure relates to a shift device, and more particularly, to a shift device including a shift switching member including a plurality of valley portions.

BACKGROUND DISCUSSION

In the related art, a shift device including a shift switching member including a plurality of valley portions has been known (for example, see JP 2016-75364A (Reference 1)).

Reference 1 discloses a shift device including a detent plate including a plurality of (four) valley portions. The shift device includes a motor, a detent spring, and a controller. The detent plate is a shift switching unit that is driven by a motor to switch a shift range (a P position, an N position, an R position, and a D position). The detent spring fixes the shift range of the detent plate. The controller learns (acquires) shift positions when the motor is driven to move the detent spring such that the detent spring continuously passes through the plurality of valley portions.

Here, in the shift device according to Reference 1, in order to control forward movement, reverse movement, and braking of a vehicle, it is required that shift switching is continuously executed even when an abnormality occurs in the controller.

Therefore, in order to implement the shift device described above, it is conceivable to apply a shift-by-wire system including a first microcomputer and a second microcomputer (for example, see JP 2018-40426A (Reference 2)).

The shift-by-wire system according to Reference 2 includes a motor, a detent plate, and a detent spring. In the shift-by-wire system, the motor is controlled to be driven by either a first microcomputer or a second microcomputer at the time of shift switching. Since the shift-by-wire system is provided with the first microcomputer and the second microcomputer that are capable of controlling the motor, even when one of the first microcomputer and the second microcomputer is abnormal at the time of shift switching, drive control of the motor can be continuously executed by the other microcomputer. However, Reference 2 does not disclose the drive control of the motor executed by the first microcomputer and the second microcomputer at the time of acquiring a shift position.

Accordingly, by applying the shift-by-wire system according to Reference 2 to the shift device according to Reference 1, it is possible to implement a shift device including a first microcomputer and a second microcomputer. That is, a shift device capable of continuously executing shift switching is implemented even when an abnormality occurs in a controller.

Here, in the shift device including the first microcomputer and the second microcomputer, shift position learning is executed by the first microcomputer and the second microcomputer, although not specified in Reference 2. As an example of the shift position learning, in the above shift device, in order to cause the motor to easily output a torque necessary for driving the detent plate at the time of the shift position learning, it is conceivable to apply a voltage to the motor from both the first microcomputer and the second microcomputer. That is, in both the first microcomputer and the second microcomputer, it is considered that the shift position learning is executed by recognizing a position of the detent spring while applying the voltage to the motor to drive the motor. In such a case, when the shift position learning of the first microcomputer is completed but the learning of the second microcomputer is not completed, the second microcomputer may drive the motor while the first microcomputer brakes the motor. Therefore, in such a shift device, the shift position learning of the first microcomputer (a first control unit) and the shift position learning of the second microcomputer (a second control unit) may be hindered from each other due to a fact that control of the motor executed by the first microcomputer and control of the motor executed by the second microcomputer interfere with each other.

A need thus exists for a shift device which is not susceptible to the drawback mentioned above.

SUMMARY

In order to address the above need, a shift device according to one aspect of this disclosure includes: a shift switching member including a plurality of valley portions corresponding to shift positions; a motor that includes a rotor and a stator and that is configured to drive the shift switching member; a first drive system including a first control unit configured to control a voltage for driving the motor; a second drive system that is provided separately from the first drive system and that includes a second control unit configured to control the voltage for driving the motor; and a positioning member configured to establish the shift positions in a state in which the positioning member is fitted into any one of the plurality of valley portions of the shift switching member. The shift device is configured to acquire the shift positions when the motor is driven by the voltage output from one of the first drive system and the second drive system to move the positioning member such that the positioning member continuously passes through the plurality of valley portions.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, embodiments disclosed here will be described with reference to the drawings.

A configuration of a shift device 100 will be described with reference to FIGS. 1 to 13. In the specification of the present application, the term "a rotation angle of a motor" and the term "a rotation angle of a rotor" have the same meaning.

Figure 1:
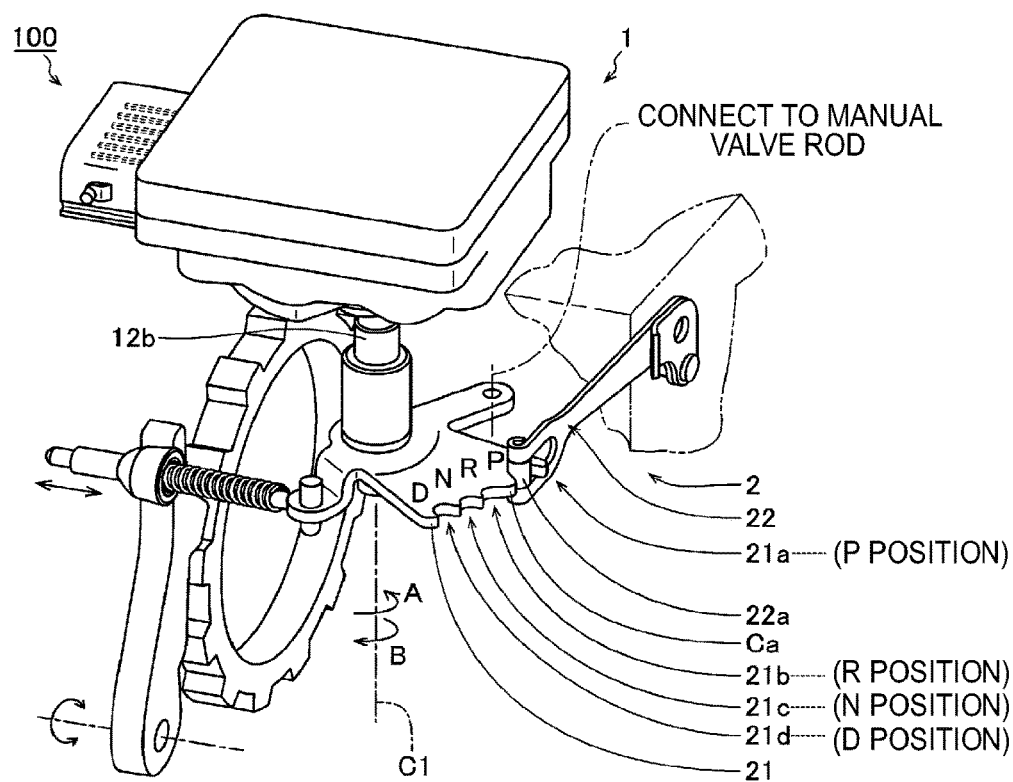
FIG. 1 is a perspective view schematically showing an overall configuration of a shift device according to the present embodiment.

The shift device 100 is mounted on a vehicle such as an automobile. As shown in FIG. 1, in a vehicle, when an occupant (a driver) performs a shift switching operation with an operation unit such as a shift lever (or a shift switch), a speed change mechanism is subjected to electrical shift switching control. That is, a position of the shift lever is input to a shift device 100 side via a shift sensor provided in the operation unit. Then, based on control signals transmitted from a dedicated first microcontroller unit (MCU) 171 and a dedicated second MCU 181 to be described later that are provided in the shift device 100, the speed change mechanism is switched to any one of shift positions of a parking (P) position, a reverse (R) position, a neutral (N) position, and a drive (D) position corresponding to a shift operation of the occupant. Such shift switching control is called shift-by-wire (SBW).

The shift device 100 includes an actuator unit 1 and a shift switching mechanism 2 driven by the actuator unit 1. The shift switching mechanism 2 is mechanically connected to a manual spool valve (not shown) of a hydraulic valve body in a hydraulic control circuit unit (not shown) and a parking mechanism in the speed change mechanism. A shift state (the P position, the R position, the N position, and the D position) of a transmission is mechanically switched by driving the shift switching mechanism 2.

Figure 7:
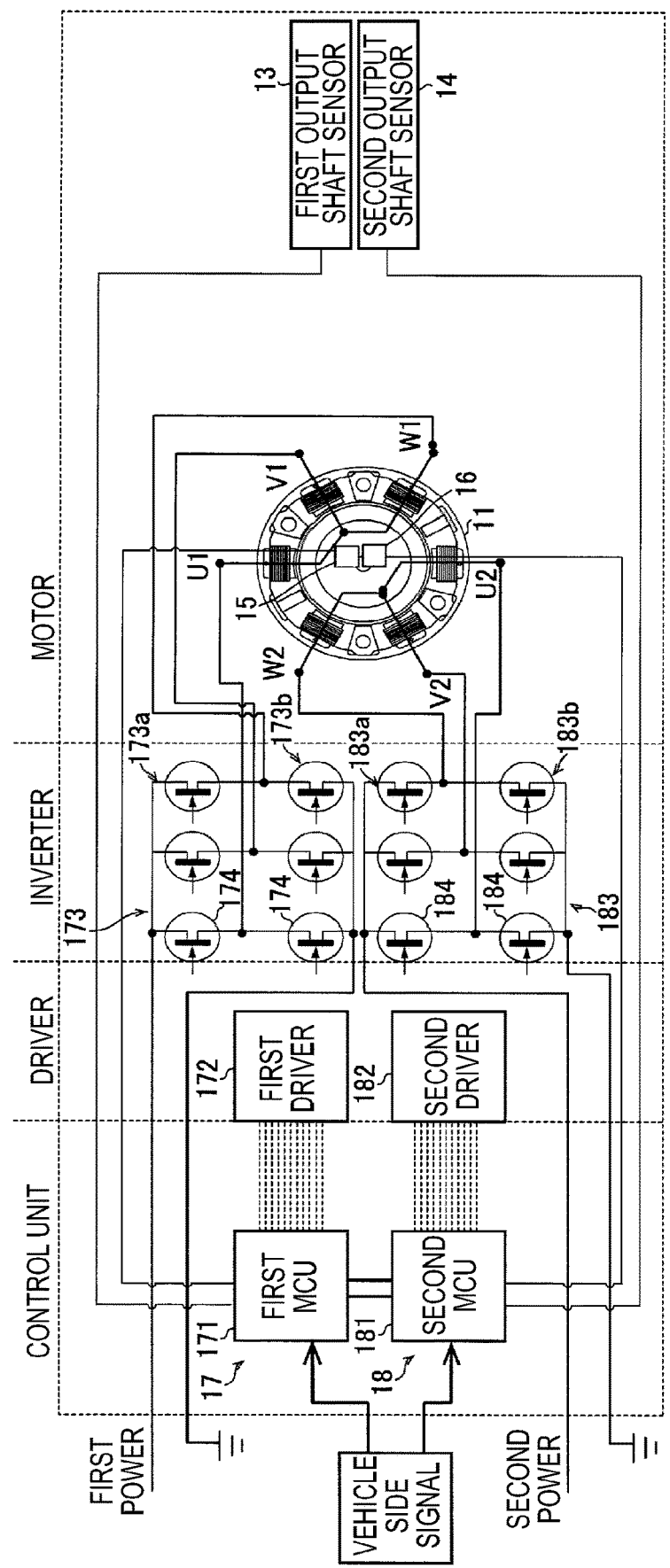
FIG. 7 is a block diagram showing a first drive system and a second drive system according to the present embodiment.

The actuator unit 1 includes a motor 11, a driving force transmission mechanism 12, a first output shaft sensor 13 (see FIG. 7), a second output shaft sensor 14 (see FIG. 7), a first motor rotation angle sensor 15 (see FIG. 7), a second motor rotation angle sensor 16 (see FIG. 7), a first drive system 17 (see FIG. 7), and a second drive system 18 (see FIG. 7).

As shown in FIG. 1, the shift switching mechanism 2 includes a detent plate 21 (an example of a "shift switching member" in the claims) and a detent spring 22 (an example of a "positioning member" in the claims). The detent spring 22 holds the detent plate 21 at rotation angle positions corresponding to the P position, the R position, the N position, and the D position.

Figure 2:
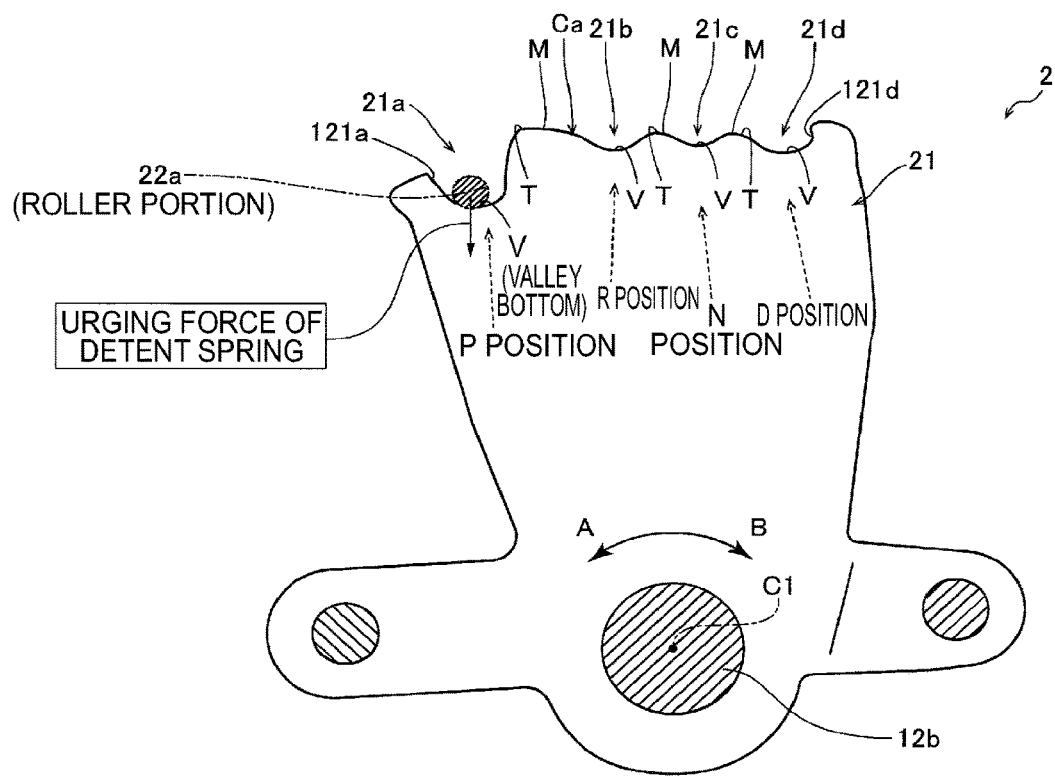
FIG. 2 is a view showing a structure of a detent plate constituting the shift device according to the present embodiment.

As shown in FIG. 2, the detent plate 21 includes a plurality of (four) valley portions 21*a*, 21*b*, 21*c*, and 21*d* (a plurality of valley portions) corresponding to the shift positions (the P position, the R position, the N position, and the D position). The valley portion 21*a*, the valley portion 21*b*, the valley portion 21*c*, and the valley portion 21*d* form a cam surface Ca having a continuous undulating shape on the detent plate 21. Adjacent valley portions (for example, the valley portion 21*a* and the valley portion 21*b*, the valley portion 21*b* and the valley portion 21*c*, and the like) are separated by a mountain portion M having one top portion T. A base end portion (see FIG. 2) of the detent spring 22 is fixed to a casing (see FIG. 2) of the speed change mechanism, and a roller portion 22*a* is attached to a free end (see FIG. 2) side of the detent spring 22. The roller portion 22*a* of the detent spring 22 constantly presses the cam surface Ca (the position of any one of the valley portion 21*a*, the valley portion 21*b*, the valley portion 21*c*, the valley portion 21*d*, and the mountain portion M). Further, the detent spring 22 establishes the shift position in a state in which the detent spring 22 is fitted into any of the plurality of valley portions 21*a*, 21*b*, 21*c*, and 21*d*.

As shown in FIG. 2, the valley portion 21*a* formed on an outermost end side is provided with a wall portion 121*a* that prevents the detent spring 22 from moving beyond the valley portion 21*a*. The valley portion 21*d* formed on an outermost end side is provided with a wall portion 121*d* that prevents the detent spring 22 from moving beyond the valley portion 21*d*. Specifically, the wall portion 121*a* is provided at the valley portion 21*a* formed at an end portion of the detent plate 21 in a direction of an arrow A. The wall portion 121*d* is provided at the valley portion 21*d* formed at an end portion of the detent plate 21 in a direction of an arrow B.

As shown in FIG. 1, the detent plate 21 is fixed to a lower end portion (a Z2 side) of an output shaft 12*b* (see FIG. 3) to be described later, and the detent plate 21 is rotated around a rotation axis C1 integrally with the output shaft 12*b*. Accordingly, in the detent spring 22, the roller portion 22*a* slides along the cam surface Ca as the detent plate 21 rotates (swings) forward and reverse in the direction of the arrow A or the direction of the arrow B, so that the roller portion 22*a* is fitted into any of the valley portion 21*a*, the valley portion 21*b*, the valley portion 21*c*, and the valley portion 21*d* by an urging force of the detent spring 22. In the detent spring 22, the roller portion 22*a* is selectively fitted into any of the valley portion 21*a*, the valley portion 21*b*, the valley portion 21*c*, and the valley portion 21*d* of the detent plate 21, so that the detent plate 21 is held at a rotation angle position corresponding to the P position, the R position, the N position, or the D position. Accordingly, the P position, the R position, the N position, or the D position is individually established.

Next, a detailed configuration of the actuator unit 1 will be described.

Figure 3:
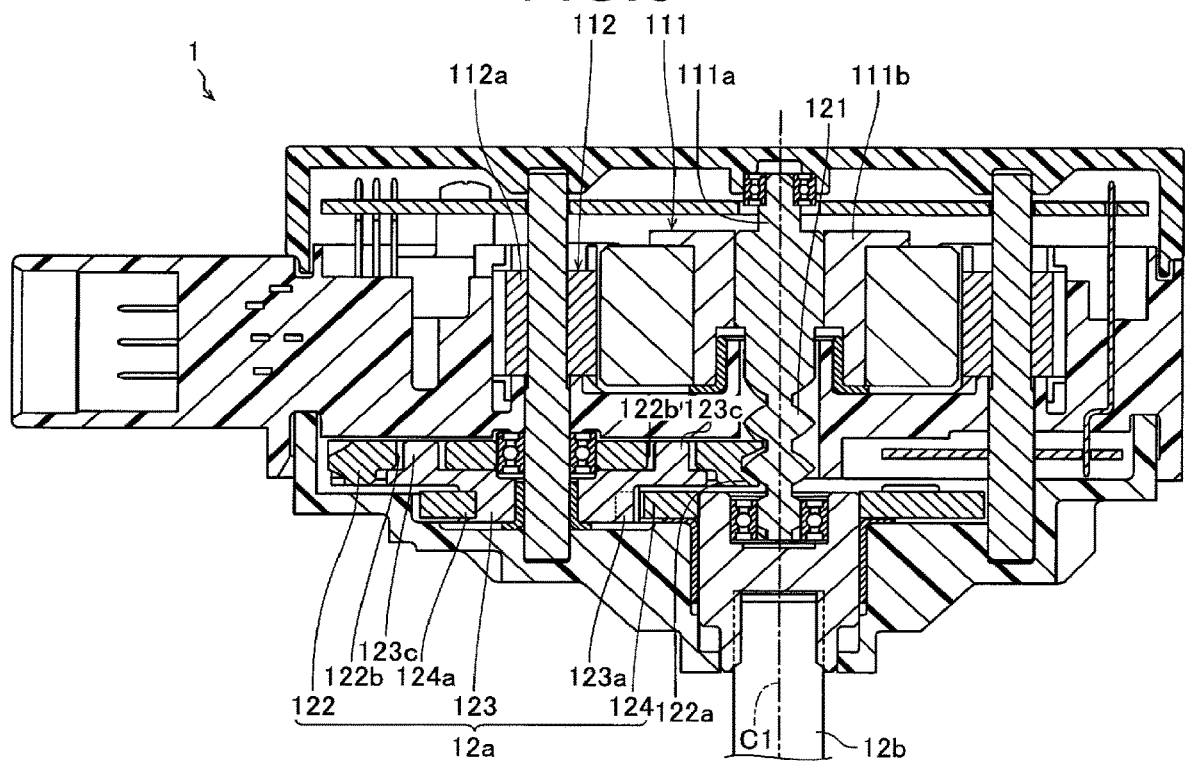
FIG. 3 is a cross-sectional view showing an actuator unit constituting the shift device according to the present embodiment.

As shown in FIG. 3, the motor 11 includes a rotor 111 that is supported rotatably with respect to a motor housing and a stator 112 that faces the rotor 111 with a magnetic gap around the rotor 111. The motor 11 drives the detent plate 21.

A surface magnet type (SPM) three-phase motor in which a permanent magnet is incorporated in a surface of the rotor 111 is used as the motor 11. Specifically, the rotor 111 includes a shaft pinion 111a and a rotor core 111b.

The shaft pinion 111a of the rotor 111 and the output shaft 12b are rotated around the same rotation axis Cl. In the shaft pinion 111a, a gear portion 121 having a gear groove formed in a helical shape is integrally formed in an outer peripheral region extending from a central portion to the lower end portion (the Z2 side).

The stator 112 includes a stator core 112a fixed in a motor chamber of the motor housing, and an exciting coil (not shown) of a plurality of phases (a U phase, a V phase and a W phase) that generates a magnetic force by being energized.

Figure 4:
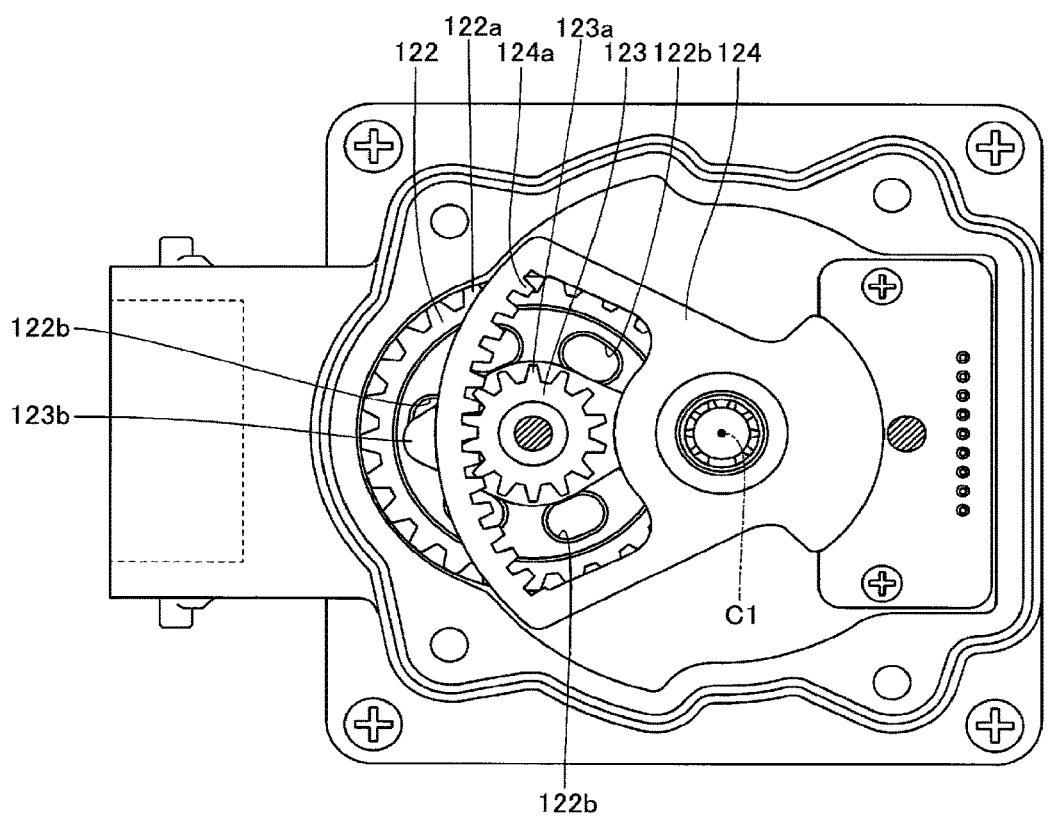
FIG. 4 is a view showing an internal structure of a speed reducing mechanism in a state in which a gear housing is removed from a main body in the actuator unit constituting the shift device according to the present embodiment.

As shown in FIGS. 3 and 4, the driving force transmission mechanism 12 transmits a driving force of the motor 11 to the detent plate 21. The driving force transmission mechanism 12 includes a speed reducing mechanism 12a and an output shaft 12b.

The speed reducing mechanism 12a rotates the detent plate 21 in a state in which a rotation speed transmitted from a motor 11 side is reduced.

Specifically, the speed reducing mechanism 12a includes the gear portion 121 of the rotor 111, an intermediate gear 122 including a gear portion 122a that meshes with the gear portion 121, an intermediate gear 123 that is provided on a lower surface side (the Z2 side) at the same axis as the intermediate gear 122 and that engages with the intermediate gear 122, and a final gear 124 including a gear portion 124a that meshes with a gear portion 123a of the intermediate gear 123.

Figure 5:
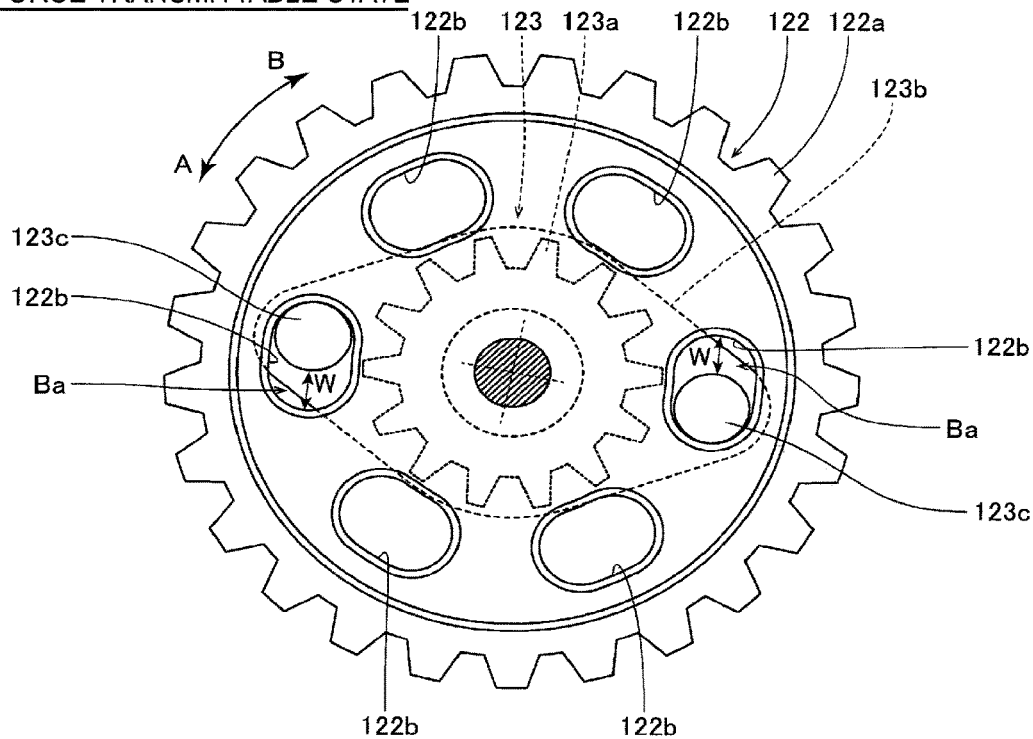
FIG. 5 is a view showing an engaged state (a driving force transmittable state) of an intermediate gear in the actuator unit constituting the shift device according to the present embodiment.
Figure 6:
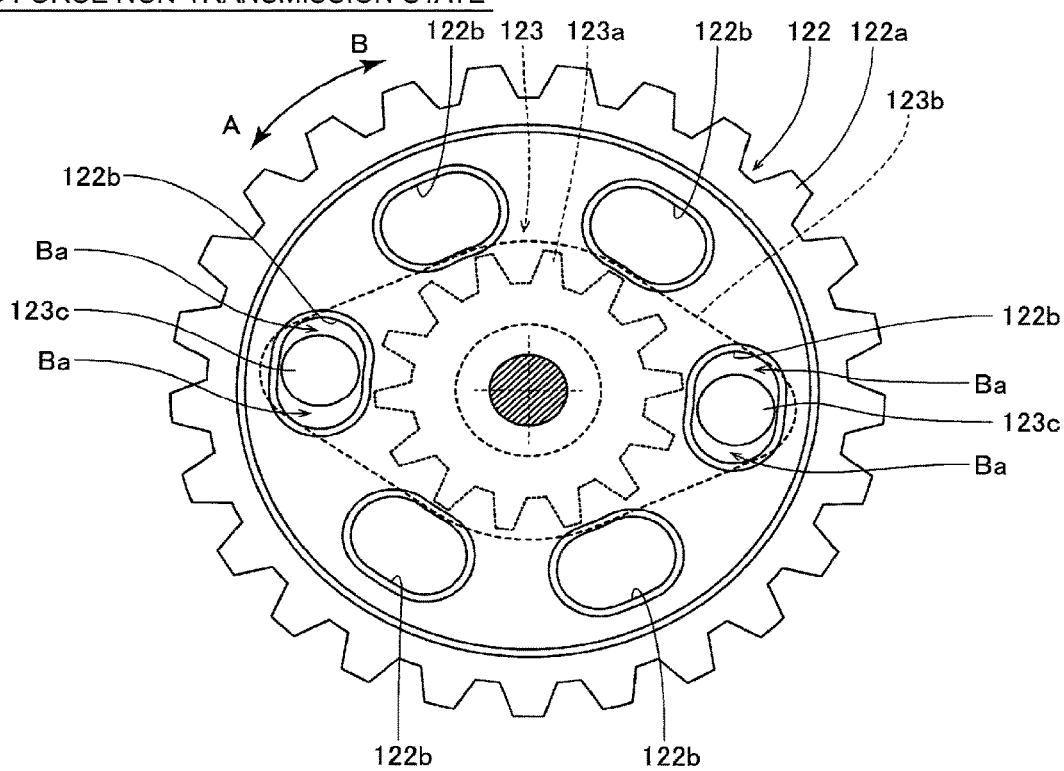
FIG. 6 is a view showing an engaged state (a driving force non-transmission state) of the intermediate gear in the actuator unit constituting the shift device according to the present embodiment.

As shown in FIGS. 5 and 6, the intermediate gear 122 is formed with a plurality of (six) elongated holes 122b having a long diameter extending along a circumferential direction between a rotation central portion and an outer peripheral portion (the gear portion 122a). The plurality of elongated holes 122b are arranged at intervals of 60 degrees in the circumferential direction. The intermediate gear 123 includes an elliptical main body portion 123b provided with the gear portion 123a, and is provided with a plurality of (two) cylindrical engaging convex portions 123c protruding upward from an upper surface (a Z1 side) of the main body portion 123b opposite to the gear portion 123a. The engaging convex portions 123c are provided at peripheral edge portions on both sides of the main body portion 123b in a long diameter direction. In a state in which the intermediate gear 123 is adjacent to the intermediate gear 122 from the lower side toward the upper side (the Z1 side), each of the engaging convex portions 123c arranged at an interval of 180° is inserted (engaged) into a corresponding one of the two elongated holes 122b of the intermediate gear 122.

The engaging convex portion 123c is fitted to the elongated hole 122b of the intermediate gear 122 with a backlash Ba having a predetermined size (a length in the circumferential direction). That is, relatively free rotation between the intermediate gear 122 and the intermediate gear 123 is allowed by the backlash Ba (a predetermined angular width) in the circumferential direction generated in the engaging convex portion 123c and the elongated hole 122b that are fitted to each other. FIG. 5 shows a state in which the driving force can be transmitted from the intermediate gear 122 to the intermediate gear 123, and FIG. 6 shows a state in which the driving force cannot be transmitted from the intermediate gear 122 to the intermediate gear 123.

The output shaft 12b outputs the driving force of the motor 11 to the detent plate 21. The output shaft 12b is connected to an output side of the speed reducing mechanism 12a. The output shaft 12b is connected to an input side of the detent plate 21. Accordingly, the output shaft 12b and the detent plate 21 integrally operate.

As shown in FIG. 7, the first output shaft sensor 13 detects a rotation angle of the output shaft 12b. For example, the first output shaft sensor 13 includes a Hall element. A rotational position (an output angle) of the output shaft 12b is detected as a continuous output shaft angle. The second output shaft sensor 14 detects the rotation angle of the output shaft 12b. For example, the second output shaft sensor 14 includes a Hall element. The rotational position (the output angle) of the output shaft 12b is detected as a continuous output shaft angle.

The first motor rotation angle sensor 15 detects a rotation angle of the rotor 111 of the motor 11. For example, the first motor rotation angle sensor 15 includes a magneto resistive (MR) sensor. The second motor rotation angle sensor 16 detects the rotation angle of the rotor 111 of the motor 11. For example, the second motor rotation angle sensor 16 includes an MR sensor.

The first drive system 17 executes control for driving the motor 11 based on measurement values of the first output shaft sensor 13 and the first motor rotation angle sensor 15. The first drive system 17 controls the motor 11 independently of the second drive system 18. Specifically, the first drive system 17 includes a first MCU 171 (an example of a "first control unit" in the claims), a storage unit (not shown), a first driver 172, and a first inverter 173.

The first MCU 171 and the storage unit are electrically connected to each other. The first MCU 171 and the first output shaft sensor 13 are electrically connected to each other. The first MCU 171 and the first motor rotation angle sensor 15 are electrically connected to each other. The first MCU 171 and the first driver 172 are electrically connected to each other. The first driver 172 and the first inverter 173 are electrically connected to each other.

The first MCU 171 controls a voltage for driving the motor 11. The first MCU 171 is a board component in which electronic components are mounted on a board. The storage unit is a storage device including memories such as a read only memory (ROM) and a random access memory (RAM). The first driver 172 transmits a signal for controlling the first inverter 173. The first driver 172 is an electronic component. The first inverter 173 includes a plurality of (six) driving field effect transistors (FET) 174 that are switched between ON and OFF in response to a signal from the first driver 172. In the first inverter 173, by switching ON and OFF of the plurality of driving FETs 174, sine-wave three-phase AC voltages (a U phase, a V phase, and a W phase) are output. The first inverter 173 includes an upper arm 173a including the plurality of (three) driving FETs 174 and a lower arm 173b including the plurality of (three) driving FETs 174.

The second drive system 18 executes control for driving the motor 11 based on measurement values of the second output shaft sensor 14 and the second motor rotation angle sensor 16. The second drive system 18 controls the motor 11 independently of the first drive system 17. Specifically, the second drive system 18 includes a second MCU 181 (an example of a "second control unit" in the claims), a storage unit (not shown), a second driver 182, and a second inverter 183.

The second MCU 181 and the storage unit are electrically connected to each other. The second MCU 181 and the second output shaft sensor 14 are electrically connected to each other. The second MCU 181 and the second motor rotation angle sensor 16 are electrically connected to each other. The second MCU 181 and the second driver 182 are electrically connected to each other. The second driver 182 and the second inverter 183 are electrically connected to each other. The first MCU 171 and the second MCU 181 can communicate with each other.

The second MCU 181 controls the voltage for driving the motor 11. The second MCU 181 is a board component in which electronic components are mounted on a board. The storage unit is a storage device including memories such as a ROM and a RAM. The second driver 182 transmits a signal for controlling the second inverter 183. The second driver 182 is an electronic component. The second inverter 183 includes a plurality of (six) driving FETs 184 that are switched between ON and OFF in response to a signal from the second driver 182. In the second inverter 183, by switching ON and OFF of the plurality of driving FETs 184, the sine-wave three-phase AC voltages (the U phase, the V phase, and the W phase) are output. The second inverter 183 includes an upper arm 183a including the plurality of (three) driving FETs 184, and a lower arm 183b including the plurality of (three) driving FETs 184.

Next, relation between a movement of the shift position and an output value of the second output shaft sensor 14 and an output value of the second motor rotation angle sensor 16 will be described. Relation between an output value of the first output shaft sensor 13 and an output value of the first motor rotation angle sensor 15 is similar to relation between the output value of the second output shaft sensor 14 and the output value of the second motor rotation angle sensor 16.

Figure 8:
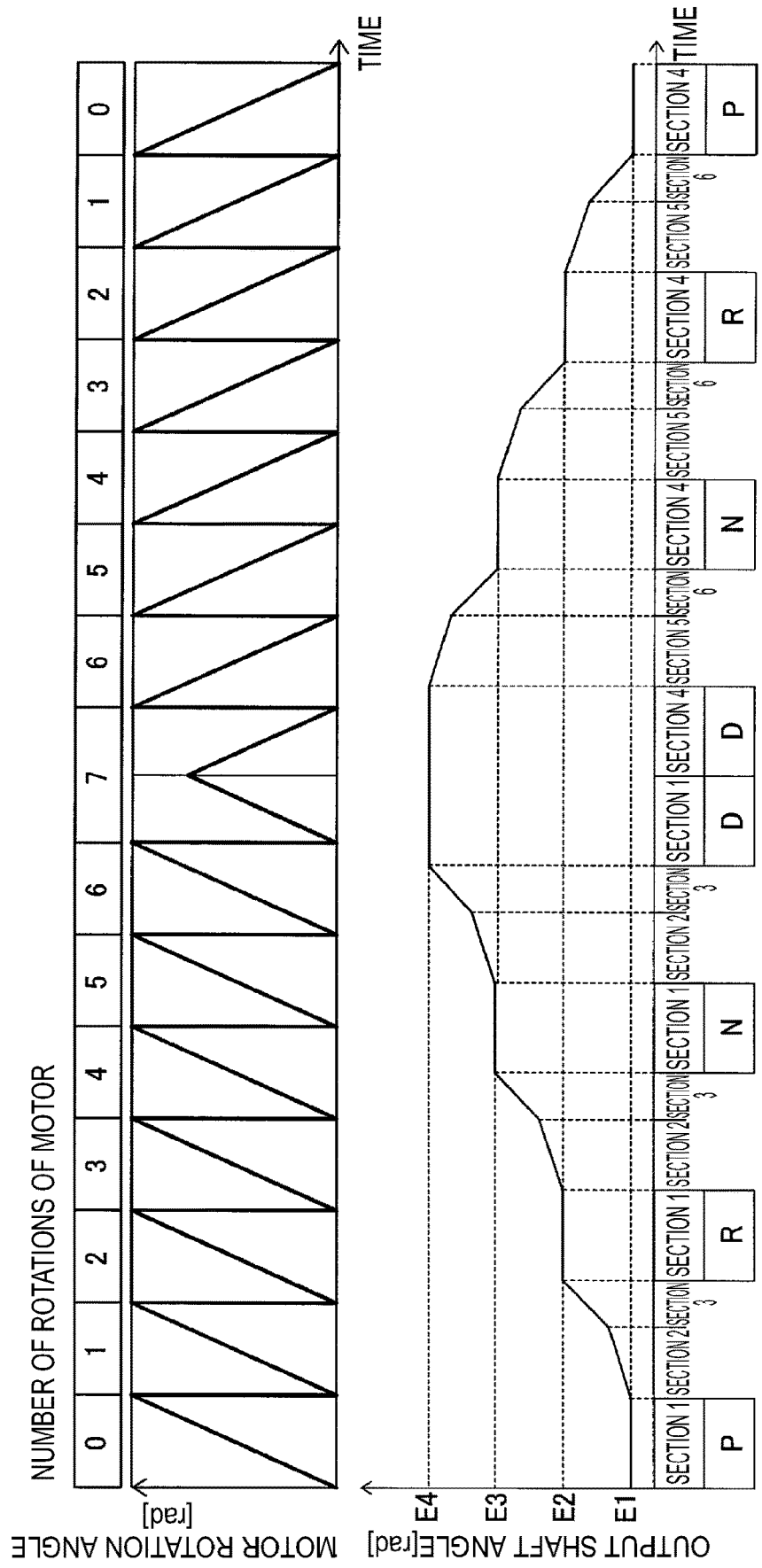
FIG. 8 is a diagram showing relation among an output value (an output shaft angle) of an output shaft angle sensor, an output value (a motor rotation angle) of a rotor rotation angle sensor, and the number of times of rotation of a motor in the shift device according to the present embodiment.

As shown in FIG. 8, as the number of rotations (0 times, 1 time, 2 times, . . . , 7 times) of the motor 11 increases, the detent plate 21 connected to the output shaft 12b rotates such that the shift position changes in an order of the P position, the R position, the N position, and the D position. At this time, the detent spring 22 is fitted into the valley portion 21a, the valley portion 21b, the valley portion 21c, and the valley portion 21d in this order. Further, the output value of the second output shaft sensor 14 increases as the number of rotations of the motor 11 increases.

Figure 9:
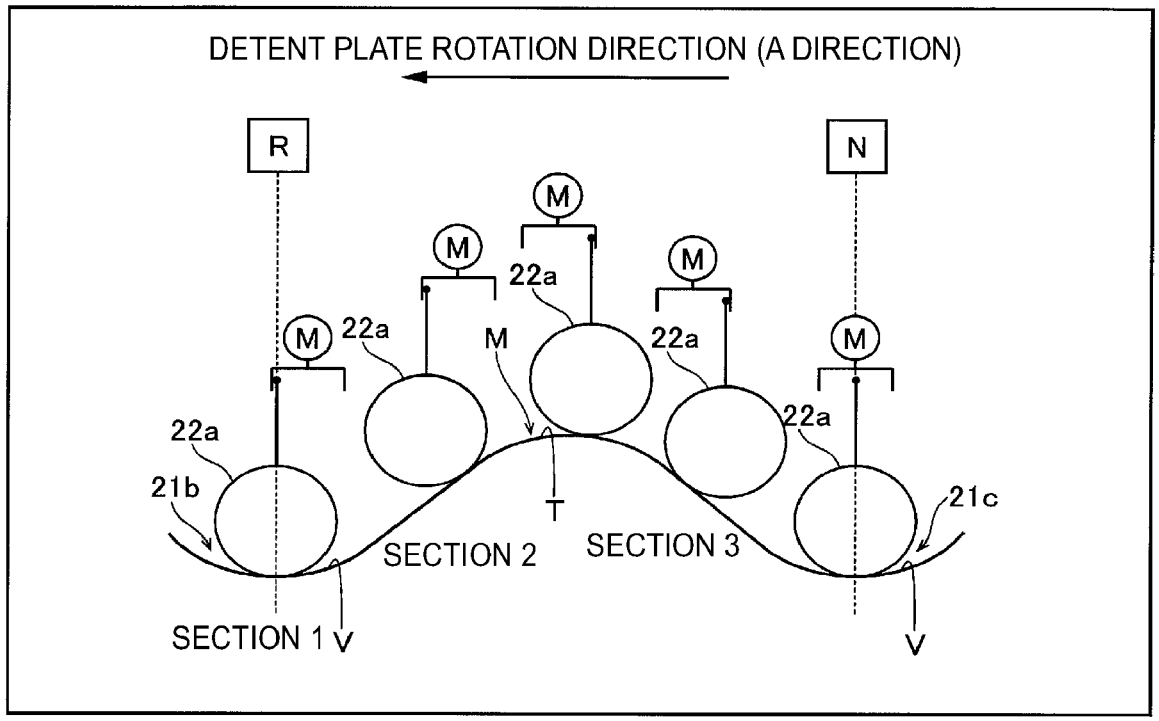
FIG. 9 is a schematic diagram showing a state in which a roller portion of the shift device according to the present embodiment is moved from an R position toward an N position.
Figure 10:
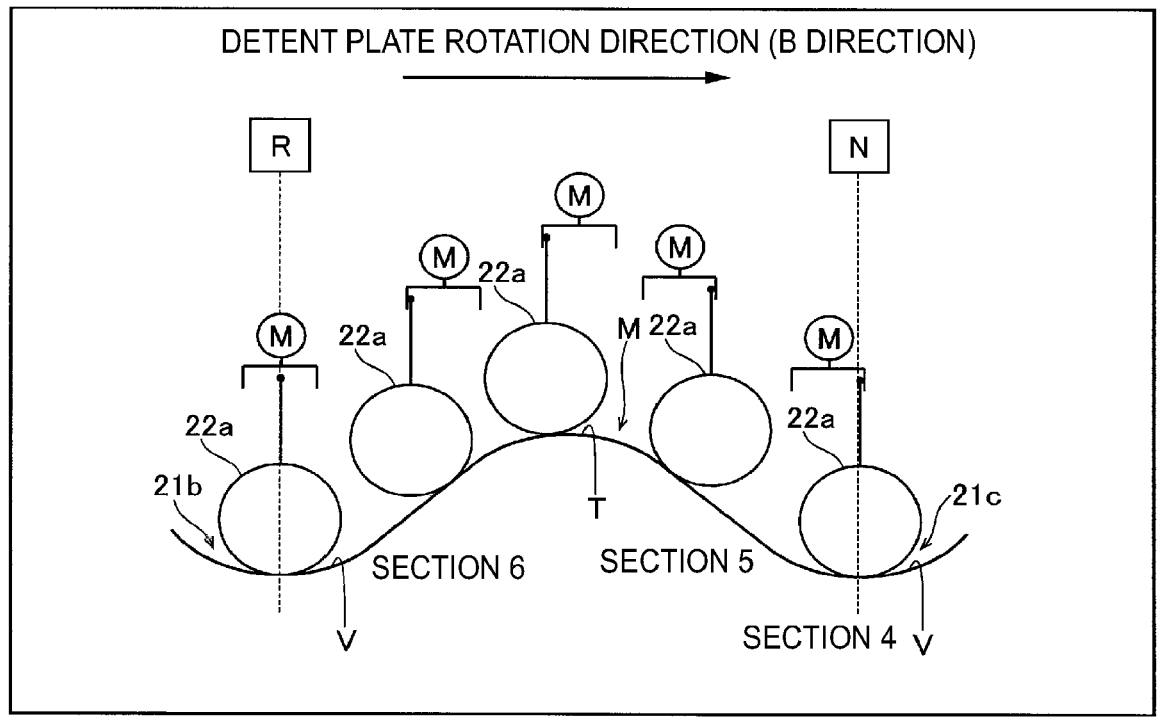
FIG. 10 is a schematic diagram showing a state in which the roller portion of the shift device according to the present embodiment is moved from the N position toward the R position.

For example, as shown in FIGS. 9 and 10, it is assumed that the roller portion 22a is currently fitted into the valley portion 21b (R position) (a section 1). By driving the motor 11 (see FIG. 3), the detent plate 21 is rotated in the direction of the arrow A via the speed reducing mechanism 12a (see FIG. 1). A predetermined amount of backlash Ba (see FIG. 6) is provided between the intermediate gear 122 and the intermediate gear 123. Therefore, in a state in which the roller portion 22a is completely fitted into a valley bottom V of the valley portion 21b, the engaging convex portion 123c is engaged with an inside of the elongated hole 122b by utilizing the backlash Ba so as not to transmit the driving force even though the intermediate gear 122 is rotated with a rotation of the rotor 111, and thus the intermediate gear 123 is not rotated. As a result, in the section 1, while the rotation angle (the rad) of the motor 11 detected by the second motor rotation angle sensor 16 (see FIG. 8) linearly increases, the rotation angle (the output shaft angle (rad)) of the output shaft 12b detected by the second output shaft sensor 14 (see FIG. 8) is constant.

Thereafter, in a section 2, one side end portion of the elongated hole 122b of the intermediate gear 122 is engaged with the engaging convex portion 123c of the intermediate gear 123 so as to transmit the driving force, and thus the driving force of the motor 11 is transmitted to the output shaft 12b (see FIG. 1) via the gear portion 121, the intermediate gear 122, the intermediate gear 123, and the final gear 124 (see FIG. 3). Further, as the detent plate 21 rotates in the direction of the arrow A, the roller portion 22a moves so as to ascend a slope of the valley portion 21b (the R position) on the valley portion 21c (the N position) side toward the mountain portion M. In the section 2, the rotation angle (the rad) of the motor 11 detected by the second motor rotation angle sensor 16 (see FIG. 8) linearly increases. The rotation angle (the rad) of the output shaft 12b detected by the second output shaft sensor 14 (see FIG. 8) increases at a constant rate.

In a section 3, after the roller portion 22a climbs over the mountain portion M at a boundary between the valley portion 21b (the R position) and the valley portion 21c (the N position), the detent plate 21 is rotated ahead of the motor 11 (the intermediate gear 122). That is, the detent plate 21 is always urged toward the valley portion 21b by the roller portion 22a, and thus the detent plate 21 is rotated by this urging force ahead of the motor 11 within a range of a size of the backlash Ba of the elongated hole 122b. Then, the roller portion 22a is dropped toward the valley bottom V of the valley portion 21c (see the section 3 in FIG. 8). At this time, while the rotation angle of the motor 11 increases, the rotation angle (the rad) of the output shaft 12b rapidly increases as the roller portion 22a drops (is suctioned) into the valley bottom V.

An operation of moving the shift position from the P position to the R position and an operation of moving the shift position from the N position to the D position are the same as the above operation of moving the shift position from the R position to the N position.

As shown in FIGS. 8 and 10, by reversing a rotation direction of the motor 11, the shift position is moved to the R position via the N position (a section 4), a section 5, and a section 6.

An operation at the N position (the section 4) is the same as the above operation at the section 1. That is, while the rotation angle (the rad) of the motor 11 detected by the second motor rotation angle sensor 16 linearly decreases, the rotation angle (the rad) of the output shaft 12b detected by the second output shaft sensor 14 is constant.

An operation in the section 5 is the same as the above operation in the section 2. That is, in the section 5, the rotation angle of the motor 11 linearly decreases, and the rotation angle (the rad) of the output shaft 12b decreases at a constant rate.

An operation in the section 6 is the same as the above operation in the section 3. That is, while the rotation angle of the motor 11 decreases, the rotation angle (the rad) of the output shaft 12b rapidly decreases as the roller portion 22a drops (is suctioned) into the valley bottom V.

Learning of Shift Position by Second Drive System

In the shift device 100, for example, at the time of factory shipment, the rotation angle of the motor 11 (the rotor 111) corresponding to the valley bottom V is acquired (learned) for each shift device 100. That is, the rotation angle of the motor 11 (the rotor 111) corresponding to the valley bottom V (a center of the backlash Ba) at each of the plurality of shift positions (the P position, the R position, the N position, and the D position) is acquired (learned). Specifically, a width W of a backlash provided in the speed reducing mechanism 12a is detected in the valley portion 21a, the valley portion 21b, the valley portion 21c, and the valley portion 21d corresponding to the plurality of shift positions (the P position, the R position, the N position, and the D position). The center of the detected width W of the backlash Ba is learned as the valley bottom V (the shift position). The acquisition of the rotation angle of the motor 11 corresponding to the valley bottom V is executed by the first MCU 171 and the second MCU 181.

Here, in the shift device 100 according to the present embodiment, since the control of the motor 11 executed by the first drive system 17 and the control of the motor 11 executed by the second drive system 18 are executed independently of each other, it is necessary to prevent interference between the control of the motor 11 executed by the first drive system 17 and the control of the motor 11 executed by the second drive system 18 at the time of learning the shift positions. Therefore, in the shift device 100, in order to prevent driving interference between the first drive system 17 and the second drive system 18, the motor 11 is controlled using only one of the first drive system 17 and the second drive system 18 at the time of acquiring the shift positions (the P position, the R position, the N position, and the D position).

Specifically, the shift device 100 acquires the shift positions (the P position, the R position, the N position, and the D position) when the motor 11 is driven by the voltage output from the second drive system 18 to move the detent spring 22 such that the detent spring 22 continuously passes through the valley portion 21a, the valley portion 21b, the valley portion 21c, and the valley portion 21d (the plurality of valley portions). That is, in the shift device 100, when the shift positions (the P position, the R position, the N position, and the D position) are acquired, the motor 11 is driven by the second drive system 18 based on the measurement values of the second motor rotation angle sensor 16 and the second output shaft sensor 14.

When the detent spring 22 is moved, the first MCU 171 executes control for acquiring the shift positions (the P position, the R position, the N position, and the D position) based on the measurement values of the first motor rotation angle sensor 15 and the first output shaft sensor 13. The second MCU 181 executes, independently of the first MCU 171, the control for acquiring the shift positions (the P position, the R position, the N position, and the D position) based on the measurement values of the second motor rotation angle sensor 16 and the second output shaft sensor 14.

Here, when the motor 11 is driven only by the second drive system 18, ON and OFF of each of the plurality of (six) driving FETs 184 of the second drive system 18 is switched, so that an energization pattern of a driving current output to the motor 11 is changed. All the driving FETs 174 of the first drive system 17 are OFF.

Figure 11:
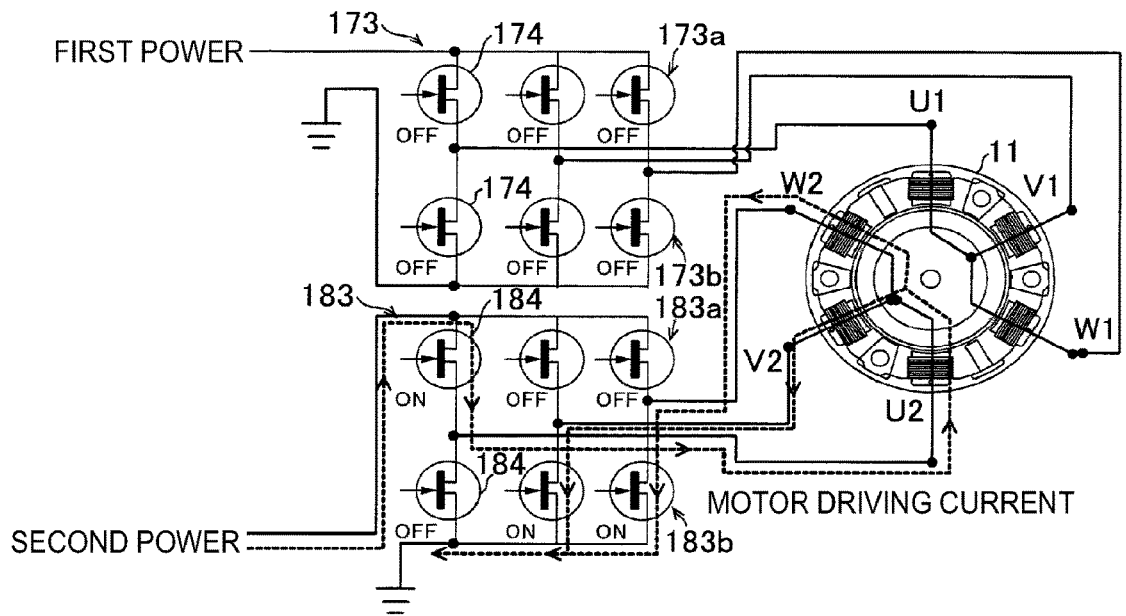
FIG. 11 is a schematic diagram showing an example of an energization pattern when the motor is driven by the second drive system of the shift device according to the present embodiment.

An example of the energization pattern of the driving current output to the motor 11 is shown in FIG. 11. In the first drive system 17, all the driving FETs 174 are OFF. In the second drive system 18, the U-phase driving FET 184 of the upper arm 183a is ON, the V-phase driving FET 184 of the upper arm 183a is OFF, and the W-phase driving FET 184 of the upper arm 183a is OFF. In the second drive system 18, the U-phase driving FET 184 of the lower arm 183b is OFF, the V-phase driving FET 184 of the lower arm 183b is ON, and the W-phase driving FET 184 of the lower arm 183b is ON.

Accordingly, the driving current flows from the U phase of the upper arm 183a to the V phase and the W phase of the lower arm 183b through the exciting coil of the motor 11, thereby driving the motor 11.

Figure 12:
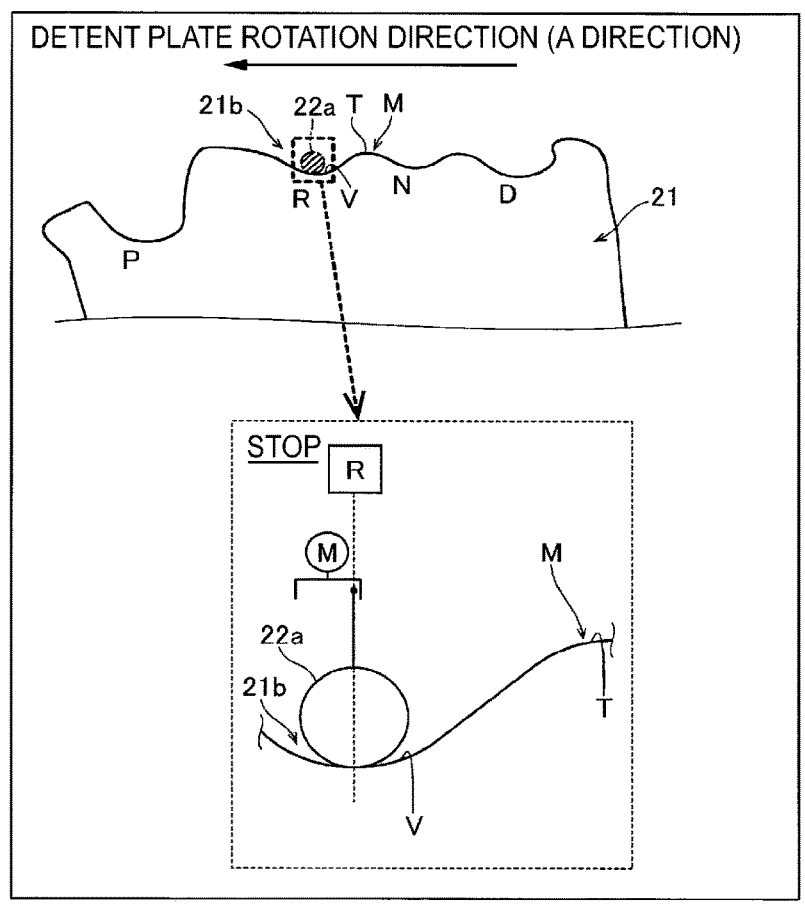
FIG. 12 is a schematic diagram showing a state in which the shift device according to the present embodiment is stopped for a predetermined time at each of valley bottoms of a plurality of valley portions.

As shown in FIG. 12, in the shift device 100, in order to improve positional accuracy of the shift position acquired by the first output shaft sensor 13 and the second output shaft sensor 14, a movement of the detent spring 22 is stopped for a predetermined time at the valley bottom V of each of the valley portion 21a, the valley portion 21b, the valley portion 21c, and the valley portion 21d (the plurality of valley portions). In FIG. 12, a case of the valley bottom V of the valley portion 21b is described as an example, but the movement of the detent spring 22 is similarly stopped for the predetermined time at the valley bottom V of each of the other valley portions 21a, 21c, and 21d.

That is, the first output shaft sensor 13 and the second output shaft sensor 14 are attached to the output shaft 12b via springs (not shown). Since the output shaft 12b is rotated by the driving force transmitted from the motor 11, the spring vibrates with the rotation of the output shaft 12b. Therefore, even after the movement of the detent spring 22 is stopped, the first output shaft sensor 13 and the second output shaft sensor 14 vibrate for a while due to the vibration of the spring. As described above, in order to recover measurement accuracy of the first output shaft sensor 13 and the second output shaft sensor 14, the movement of the detent spring 22 is stopped for the predetermined time.

In the shift device 100, as the detent spring 22 moves, a deviation (a sensor delay) occurs between an actual position of the detent spring 22 and a measurement position of the detent spring 22 measured by the first output shaft sensor 13 and the second output shaft sensor 14. Therefore, in order to eliminate the sensor delay, the movement of the detent spring 22 is stopped for the predetermined time.

As described above, on the basis that the detent spring 22 is disposed in the section (the section 1 and the section 4) of the valley bottom V of each of the valley portion 21a, the valley portion 21b, the valley portion 21c, and the valley portion 21d, the shift device 100 stops the movement of the detent spring 22 accompanying the driving of the motor 11 performed by the voltage output from the second drive system 18 for the predetermined time when the motor 11 is driven to move the detent spring 22.

Specifically, even though the motor 11 performs driving, the second MCU 181 executes control for determining that the detent spring 22 reaches the section (the section 1 and the section 4) of the valley bottom V of each of the valley portion 21a, the valley portion 21b, the valley portion 21c, and the valley portion 21d when a state continues a predetermined number of times. In the state, the measurement value of the second output shaft sensor 14 does not change. Even though the motor 11 performs driving, the first MCU 171 executes control for determining that the detent spring 22 reaches the section (the section 1 and the section 4) of the valley bottom V of each of the valley portion 21a, the valley portion 21b, the valley portion 21c, and the valley portion 21d when a state continues a predetermined number of times. In the state, the measurement value of the first output shaft sensor 13 does not change.

Figure 13:
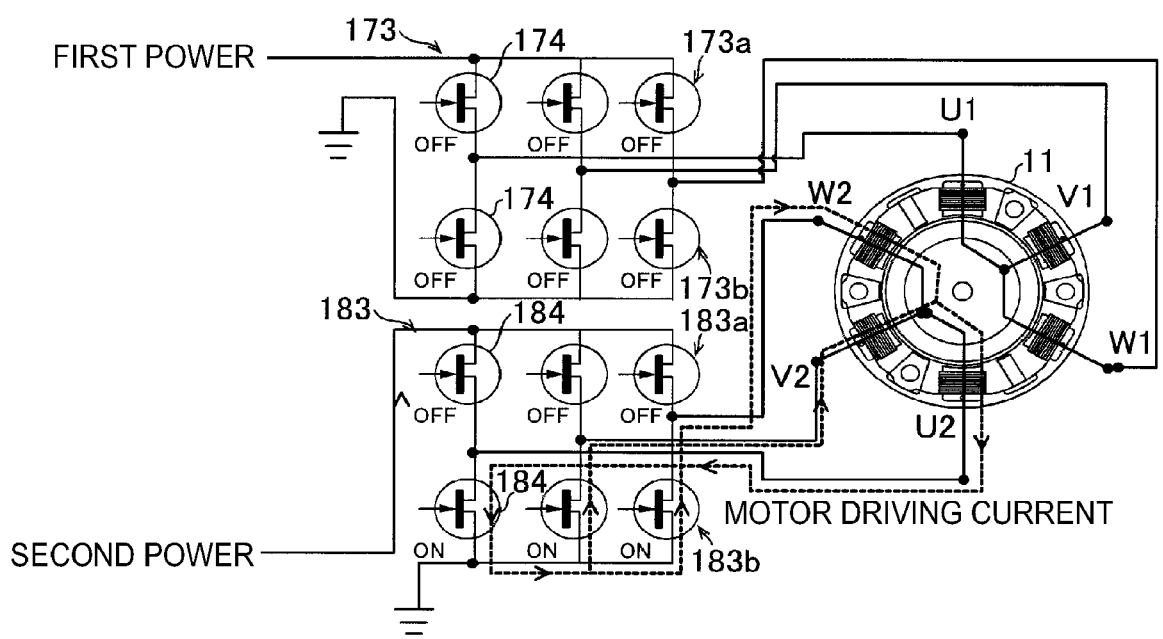
FIG. 13 is a schematic diagram showing a state in which the motor is braked by the second drive system of the shift device according to the present embodiment.

As shown in FIG. 13, the second MCU 181 executes control for braking (short braking) the driving of the motor 11 by grounding all the driving FETs 184 of the lower arm 183b of the second inverter 183 based on the determination that the detent spring 22 reaches the section of the valley bottoms V of each of the valley portion 21a, the valley portion 21b, the valley portion 21c, and the valley portion 21d.

The second MCU 181 executes control for stopping the movement of the detent spring 22 for the predetermined time after braking the driving of the motor 11. That is, the second MCU 181 executes control for counting the predetermined time on the basis that the driving of the motor 11 is braked. Similarly, the first MCU 171 executes the control for counting the predetermined time on the basis that the driving of the motor 11 is braked.

The shift device 100 re-drives the motor 11 by outputting the voltage again from the second drive system 18 on the basis that the movement of the detent spring 22 is stopped for the predetermined time. Accordingly, in the shift device 100, the width W of the backlash can be measured in each of the valley portion 21a, the valley portion 21b, the valley portion 21c, and the valley portion 21d in a state in which the measurement accuracy is recovered and the sensor delay is eliminated.

Here, in the shift device 100, as described above, since the first MCU 171 and the second MCU 181 measure (count) the predetermined time independently, when a control cycle of the first MCU 171 and a control cycle of the second MCU 181 are deviated from each other, the second drive system 18 may re-drive the motor 11 even though the first drive system 17 is in a state of measuring the predetermined time. In this case, in the first drive system 17, an error between the actual position of the valley bottom V and the acquired (learned) position of the valley bottom V increases.

Therefore, since the first MCU 171 and the second MCU 181 communicate with each other, the shift device 100 determines a timing at which the second drive system 18 re-drives the motor 11. Specifically, the second MCU 181 executes control for changing the timing of re-driving the motor 11 on the basis that the deviation of the control cycles of the first MCU 171 and the second MCU 181 is recognized through the communication with the first MCU 171.

In the shift device 100, both the first drive system 17 and the second drive system 18 acquires (learns) the shift positions (the P position, the R position, the N position, and the D position). Therefore, even when the learning of the shift positions fails in the first drive system 17, if the learning of the shift positions is successful in the second drive system 18, the shift positions can be switched by driving the motor 11 only by the second drive system 18. In order to eliminate such a possibility, in the shift device 100, if the learning of the shift positions in one of the first drive system 17 and the second drive system 18 fails, the learning of the shift positions is reset in the other of the first drive system 17 and the second drive system 18.

Specifically, when the first MCU 171 and the second MCU 181 communicate with each other to detect that at least one of the shift positions corresponding to the valley portion 21a, the valley portion 21b, the valley portion 21c, and the valley portion 21d is not acquired in the first drive system 17, the second drive system 18 erases the acquired shift positions corresponding to the valley portion 21a, the valley portion 21b, the valley portion 21c, and the valley portion 21d.

Shift Position Learning Process

Figure 14:
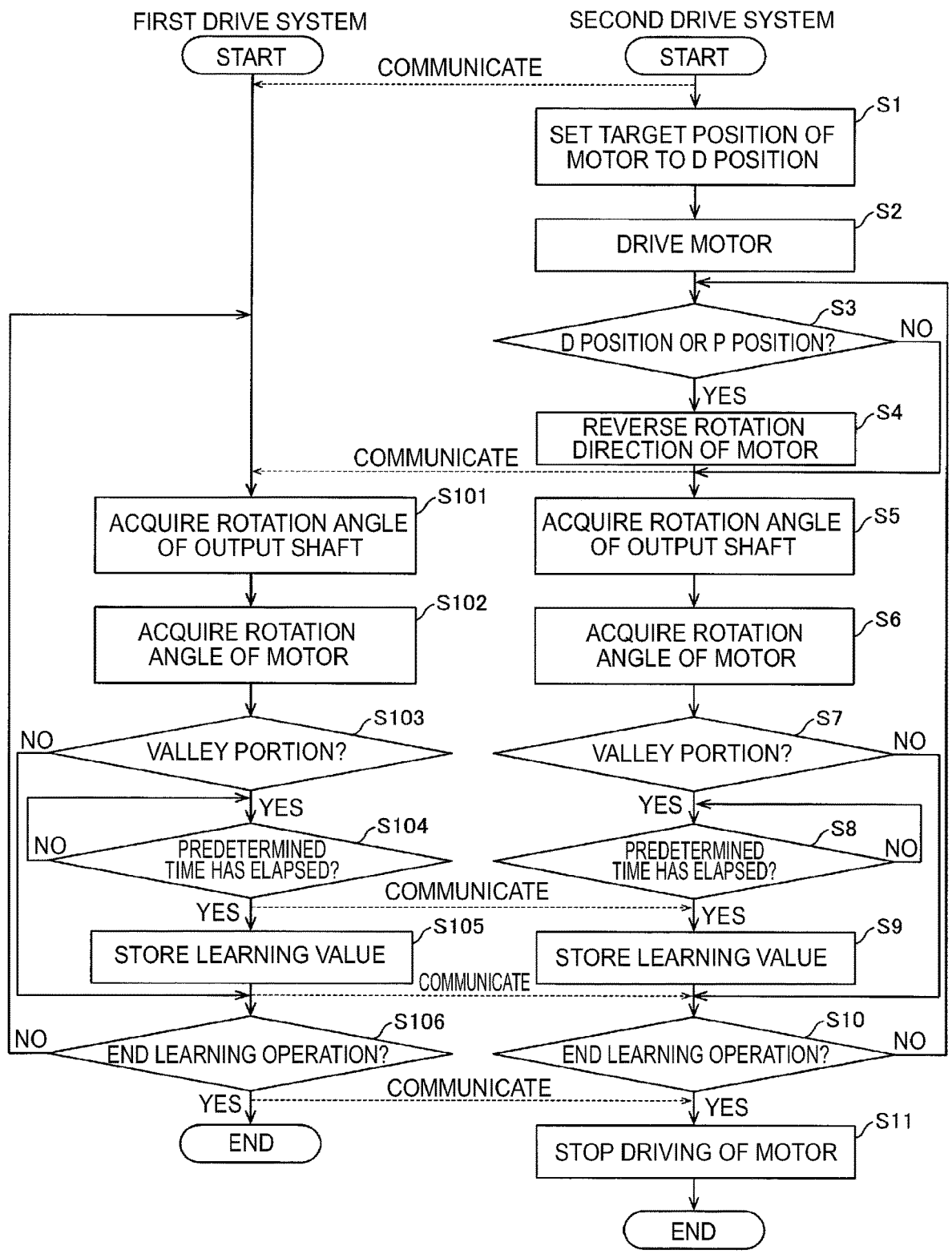
FIG. 14 is a flowchart showing a shift position learning process in the shift device according to the present embodiment.

Hereinafter, the shift position learning process executed by driving the motor 11 by the second drive system 18 will be described with reference to FIG. 14. The shift position learning process is a process of acquiring (learning) the shift position while executing communication between the first drive system 17 and the second drive system 18.

In step S1, in the second MCU 181, the target position of the motor 11 is set to the D position in order to rotate the detent plate 21 assembled to the N position and set the detent plate 21 to the D position. At this time, in the second MCU 181, based on the D position set in advance, the target position of the motor 11 is set to the D position. Information indicating that the learning of the shift position in the second drive system 18 is started is transmitted to the first MCU 171 of the first drive system 17. In step S2, in the second MCU 181, the motor 11 is driven to switch the shift position to the D position.

In step S3, in the second MCU 181, it is determined whether the shift position is the D position or the P position. When the shift position is the D position or the P position, the process proceeds to step S4, and when the shift position is not the D position or the P position, the process proceeds to step S5. In step S4, in the second MCU 181, the rotation direction of the motor 11 is reversed. At this time, information indicating that the rotation direction of the motor 11 is reversed in the second drive system 18 is transmitted to the first MCU 171 of the first drive system 17.

In step S5, in the second MCU 181, the rotation angle of the output shaft 12b is acquired by the second output shaft sensor 14. In step S6, in the second MCU 181, the rotation angle of the motor 11 is acquired by the second motor rotation angle sensor 16. In step S7, in the second MCU 181, it is determined whether the position is one of the valley portion 21a, the valley portion 21b, the valley portion 21c, and the valley portion 21d (the plurality of valley portions). In the second MCU 181, if the position is any one of the plurality of valley portions, the process proceeds to step S8, and if the position is not any one of the plurality of valley portions, the process proceeds to step S10.

In step S8, in the second MCU 181, it is determined whether the predetermined time has elapsed. In the second MCU 181, if the predetermined time has elapsed, the process proceeds to step S9, and if the predetermined time has not elapsed, step S8 is repeated. At this time, information indicating that the predetermined time has elapsed in the first drive system 17 is transmitted to the second MCU 181 of the second drive system 18.

In step S9, in the second MCU 181, learning values are stored in the storage unit. That is, in the second MCU 181, positions of the valley bottoms V of the valley portion 21a, the valley portion 21b, the valley portion 21c, and the valley portion 21d corresponding to the P position, the R position, the N position, and the D position are stored in the storage unit as learning values. At this time, information indicating that the positions of the valley bottoms V of the valley portion 21a, the valley portion 21b, the valley portion 21c, and the valley portion 21d in the first drive system 17 are stored in the storage unit as the learning values is transmitted to the second MCU 181 of the second drive system 18.

In step S10, in the second MCU 181, it is determined whether to end a learning operation. That is, in the second MCU 181, it is determined whether the positions of the valley bottoms V of the valley portion 21a, the valley portion 21b, the valley portion 21c, and the valley portion 21d corresponding to the P position, the R position, the N position, and the D position are stored in the storage unit as the learning values. If the learning operation is to be ended, the process proceeds to step S11, the driving of the motor 11 is stopped, and then the shift position learning process is ended. At this time, information indicating that the learning operation is ended in the first drive system 17 is transmitted to the second MCU 181 of the second drive system 18. If the learning operation is not to be ended, the process returns to step S3.

In parallel with the control of the second drive system 18 described above, in step S101, in the first MCU 171, the rotation angle of the output shaft 12*b* is acquired by the first output shaft sensor 13. In step S102, in the first MCU 171, the rotation angle of the motor 11 is acquired by the first motor rotation angle sensor 15. In step S103, in the first MCU 171, it is determined whether the position is one of the valley portion 21*a*, the valley portion 21*b*, the valley portion 21*c*, and the valley portion 21*d* (the plurality of valley portions). In the first MCU 171, if the position is any one of the plurality of valley portions, the process proceeds to step S104, and if the position is not any one of the plurality of valley portions, the process proceeds to step S106.

In step S104, in the first MCU 171, it is determined whether the predetermined time has elapsed. In the first MCU 171, if the predetermined time has elapsed, the process proceeds to step S105, and if the predetermined time has not elapsed, step S104 is repeated. At this time, the information indicating that the predetermined time has elapsed in the first drive system 17 is transmitted to the second MCU 181 of the second drive system 18.

In step S105, in the first MCU 171, the learning values are stored in the storage unit. That is, in the first MCU 171, the positions of the valley bottoms V of the valley portion 21*a*, the valley portion 21*b*, the valley portion 21*c*, and the valley portion 21*d* corresponding to the P position, the R position, the N position, and the D position are stored in the storage unit as the learning values. At this time, the information indicating that the positions of the valley bottoms V of the valley portion 21*a*, the valley portion 21*b*, the valley portion 21*c*, and the valley portion 21*d* in the first drive system 17 are stored in the storage unit as the learning values is transmitted to the second MCU 181 of the second drive system 18.

In step S106, in the first MCU 171, it is determined whether to end the learning operation. That is, in the first MCU 171, it is determined whether the positions of the valley bottoms V of the valley portion 21*a*, the valley portion 21*b*, the valley portion 21*c*, and the valley portion 21*d* corresponding to the P position, the R position, the N position, and the D position are stored in the storage unit as the learning values. If the learning operation is to be ended, the shift position learning process is ended. At this time, the information indicating that the learning operation is ended in the first drive system 17 is transmitted to the second MCU 181 of the second drive system 18. If the learning operation is not to be ended, the process returns to step S101.

Effects According to Present Embodiment

In the present embodiment, the following effects can be attained.

In the present embodiment, as described above, the shift device 100 acquires the shift positions when the motor 11 is driven by the voltage output from one of the first drive system 17 and the second drive system 18 to move the detent spring 22 such that the detent spring 22 continuously passes through the plurality of valley portions 21*a*, 21*b*, 21*c*, and 21*d*. Accordingly, at the time of learning the shift positions by the first MCU 171 and the second MCU 181, the shift positions are learned by recognizing the position of the detent spring 22 by both the first MCU 171 and the second MCU 181 while controlling the motor 11 by either the first drive system 17 or the second drive system 18. Therefore, at the time of learning the shift positions, since the voltage is applied to the motor 11 only from either the first MCU 171 or the second MCU 181, it is possible to prevent the control of the motor 11 executed by the first MCU 171 and the control of the motor 11 executed by the second MCU 181 from interfering with each other. As a result, since the control of the motor 11 executed by the first MCU 171 and the control of the motor 11 executed by the second MCU 181 can be prevented from interfering with each other, it is possible to prevent the learning of the shift positions of the first MCU 171 and the learning of the shift positions of the second MCU 181 from being hindered. Even when one of the first MCU 171 and the second MCU 181 is abnormal, the drive control of the motor 11 can be continued using the other MCU, and thus it is possible to guarantee that the drive control of the motor is continued.

In the present embodiment, as described above, on the basis that the detent spring 22 is disposed in the section (the section 1 and the section 4) of each of the valley bottoms V of the plurality of valley portions 21*a*, 21*b*, 21*c*, and 21*d*, the shift device 100 stops the movement of the detent spring 22 due to the driving of the motor 11 performed by the voltage output from the second drive system 18 for the predetermined time, when the motor 11 is driven by the voltage output from the second drive system 18 to move the detent spring 22 such that the detent spring 22 continuously passes through the plurality of valley portions 21*a*, 21*b*, 21*c*, and 21*d*. Accordingly, the movement of the detent spring 22 is stopped for the predetermined time on the basis that the detent spring 22 is disposed in the section (the section 1 and the section 4) of each of the valley bottoms V of the plurality of valley portions 21*a*, 21*b*, 21*c*, and 21*d*, so that it is possible to eliminate a vibration caused by the driving of the motor 11 and a deviation between the actual position of the detent spring 22 and the measured position of the detent spring 22. Therefore, it is possible to prevent deterioration of measurement accuracy of the position of the detent spring 22 caused by the above vibration and the above deviation.

In the present embodiment, as described above, the shift device 100 re-drives the motor 11 by outputting the voltage again from the second drive system 18 on the basis that the movement of the detent spring 22 is stopped for the predetermined time. Accordingly, the movement of the detent spring 22 is stopped for the predetermined time and then the detent spring 22 is re-driven, so that it is possible to acquire (learn) the position of each of the valley bottoms V of the plurality of valley portions 21*a*, 21*b*, 21*c*, and 21*d* in a static state. Therefore, it is possible to learn the shift positions with high accuracy.

In the present embodiment, as described above, the first MCU 171 and the second MCU 181 can communicate with each other. In the shift device 100, the first MCU 171 and the second MCU 181 communicate with each other, so that one of the first drive system 17 and the second drive system 18 that outputs the voltage determines the timing of re-driving the motor 11. Accordingly, it is possible to change the timing at which the motor 11 is re-driven by the second drive system 18 according to the control cycle of the first MCU 171, and thus it is possible to re-drive the motor 11 in a state in which the first MCU 171 and the second MCU 181 are synchronized.

In the present embodiment, as described above, the first MCU 171 and the second MCU 181 can communicate with each other. The first MCU 171 and the second MCU 181 communicate with each other. Accordingly, when it is detected that at least one of the shift positions corresponding to the plurality of valley portions 21*a*, 21*b*, 21*c*, and 21*d* is not acquired in the first drive system 17, the shift device 100 erases the acquired shift positions corresponding to the plurality of valley portions 21*a*, 21*b*, 21*c*, and 21*d*. Accordingly, the shift positions acquired in the second drive system 18 is erased when the acquisition of the shift positions in the first drive system 17 fails, so that it is possible to prevent the detent plate 21 from being driven using only the second drive system 18. Therefore, it is possible to prevent a shift device that drives only one of the first drive system 17 and the second drive system 18 from being manufactured.

In the present embodiment, as described above, the shift device 100 includes the first motor rotation angle sensor 15 and the second motor rotation angle sensor 16 that measure the rotation angle of the motor 11, and the first output shaft sensor 13 and the second output shaft sensor 14 that measure the rotation angle of the output shaft 12*b* connected to the detent plate 21. The first MCU 171 executes the control for acquiring the shift positions based on the measurement values of the first motor rotation angle sensor 15 and the first output shaft sensor 13, and the second MCU 181 executes the control for acquiring the shift positions based on the measurement values of the second motor rotation angle sensor 16 and the second output shaft sensor 14. Accordingly, when the motor 11 is driven by the voltage output from the second drive system 18 to move the detent spring 22 such that the detent spring 22 continuously passes through the plurality of valley portions 21*a*, 21*b*, 21*c*, and 21*d*, each of the first MCU 171 and the second MCU 181 can acquire the shift positions in parallel. Therefore, it is possible to efficiently acquire the shift positions as compared with a case in which the acquisition of the shift positions executed by the first MCU 171 and the acquisition of the shift positions executed by the second MCU 181 are executed separately from each other.

Modification

It should be considered that the above embodiment disclosed here is an example in all respects and are not restrictive. The scope of this disclosure is shown according to the claims rather than the description of the above embodiment and further includes all changes (modifications) within the scope and meaning equivalent to the claims.

For example, in the above embodiment, an example has been shown in which the motor 11 is driven by the second drive system 18 based on the measurement values of the second motor rotation angle sensor 16 and the second output shaft sensor 14 when the shift positions (the P position, the R position, the N position, and the D position) are acquired in the shift device 100, and this disclosure is not limited thereto. In this disclosure, in the shift device, at the time of acquiring the shift positions (the P position, the R position, the N position, and the D position), the motor may be driven by the first drive system based on the measurement values of the first motor rotation angle sensor and the first output shaft sensor.

In the above embodiment, an example has been shown in which the second MCU 181 (the second control unit) executes the control for changing the timing of re-driving the motor 11 on the basis that the deviation of the control cycles of the first MCU 171 (the first control unit) and the second MCU 181 (the second control unit) is recognized through the communication with the first MCU 171 (the first control unit), and this disclosure is not limited thereto. In this disclosure, the second control unit may brake the motor or change the rotation direction of the motor in addition to changing the timing of re-driving the motor, on the basis that the deviation of the control cycles of the first control unit and the second control unit is recognized through the communication with the first control unit.

In the above embodiment, an example has been shown in which the second MCU 181 (the second control unit) sets the target position of the motor 11 to the D position in order to rotate the detent plate 21 (the shift switching member) assembled to the N position and set the detent plate 21 to the D position, and this disclosure is not limited thereto. In this disclosure, the second control unit may set the target position of the motor to the P position in order to rotate the shift switching member assembled to the N position and set the shift switching member to the P position.

In the above embodiment, an example has been shown in which the width W of the backlash Ba is the width W of the backlash Ba of the speed reducing mechanism 12*a*, and this disclosure is not limited thereto. In this disclosure, the width of the backlash may include a width of a backlash of a mechanism other than the speed reducing mechanism in the driving force transmission mechanism.

In the above embodiment, an example has been shown in which the shift device 100 disclosed here is applied to a shift device for a vehicle, and this disclosure is not limited thereto. In this disclosure, the shift device may be applied to a shift device other than the shift device for a vehicle, for example, a shift device for a train.

In the above embodiment, an example has been shown in which the second MCU 181 (the second control unit) stops the movement of the detent spring 22 (the positioning member) due to the driving of the motor 11 performed by the voltage output from the second drive system 18 for the predetermined time on the basis that the detent spring 22 (the positioning member) is disposed in the section (the section 1 and the section 4) of each of the valley bottoms V of the plurality of valley portions 21*a*, 21*b*, 21*c*, and 21*d*, and this disclosure is not limited thereto. In this disclosure, the first control unit may stop the movement of the positioning member due to the driving of the motor performed by the voltage output from the first drive system for the predetermined time on the basis that the positioning member is disposed in the section (the section 1 and the section 4) of each of the valley bottoms V of the plurality of valley portions.

In the above embodiment, an example has been shown in which the first MCU 171 (the first control unit) and the second MCU 181 (the second control unit) can communicate with each other, and this disclosure is not limited thereto. In this disclosure, the first control unit and the second control unit may not be able to communicate with each other.

Figure 15:
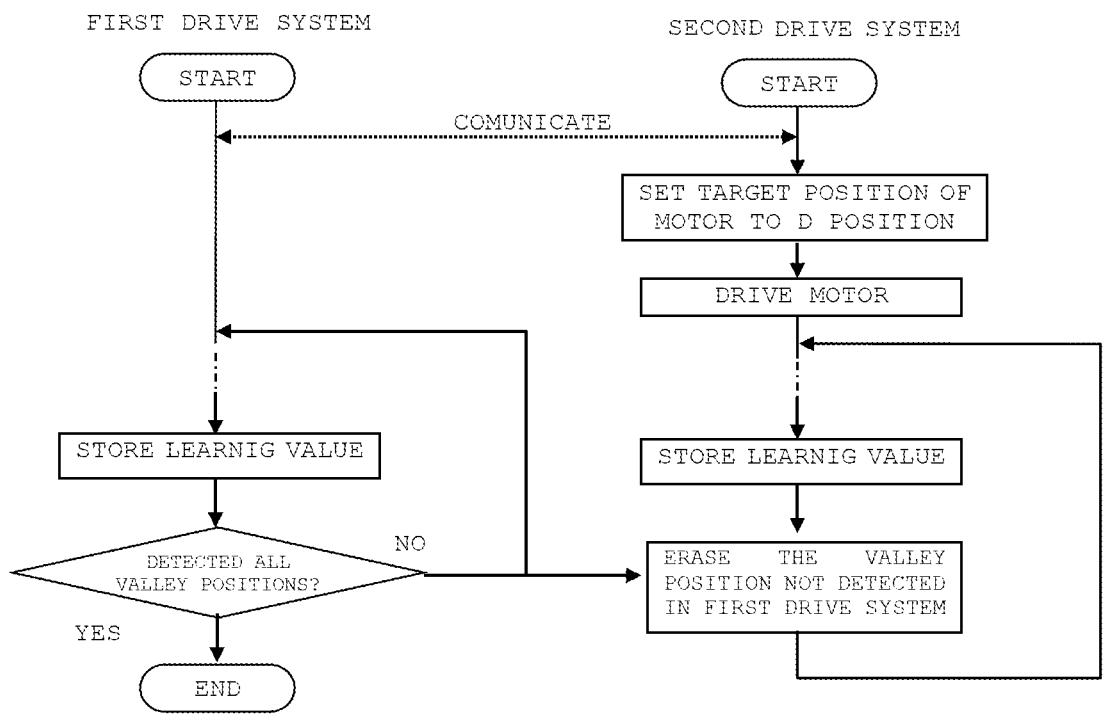
FIG. 15 is a flowchart showing a case when the first drive system does not detect all valley positions according to an embodiment of the invention.

In the above embodiment, an example has been shown. In the example, the first MCU 171 (the first control unit) and the second MCU 181 (the second control unit) communicate with each other. Accordingly, when it is detected that at least one of the shift positions corresponding to the plurality of valley portions 21*a*, 21*b*, 21*c*, and 21*d* is not acquired in the first drive system 17, the second drive system 18 erases the acquired shift positions corresponding to the plurality of valley portions 21*a*, 21*b*, 21*c*, and 21*d* (the plurality of valley portions) as shown for example in FIG. 15. This disclosure is not limited thereto. In this disclosure, the first control unit and the second control unit may communicate with each other. Accordingly, when it is detected that at least one of the shift positions corresponding to the plurality of valley portions is not acquired in the second drive system, the first drive system may erase the acquired shift positions corresponding to the plurality of valley portions.

In the above embodiment, an example has been shown in which, in the first inverter 173, by switching ON and OFF of the plurality of driving FETs 174, the sine-wave three-phase AC voltages (the U phase, the V phase, and the W phase) are output, and this disclosure is not limited thereto. In this disclosure, in the first inverter, by switching ON and OFF of the plurality of driving FETs, pulse-wave three-phase AC voltages (the U phase, the V phase, and the W phase) may be output.

In the above embodiment, an example has been shown in which, in the second inverter 183, by switching ON and OFF of the plurality of driving FETs 184, the sine-wave three-phase AC voltages (the U phase, the V phase, and the W phase) are output, and this disclosure is not limited thereto. In this disclosure, in the second inverter, by switching ON and OFF of the plurality of driving FETs, the pulse-wave three-phase AC voltages (the U phase, the V phase, and the W phase) may be output.

In the above embodiment, for convenience of description, an example has been shown in which control processes of the first MCU 171 (the first control unit) and the second MCU 181 (the second control unit) are described using a flow-driven type flowchart for sequentially executing a process according to a processing flow, and this disclosure is not limited thereto. In this disclosure, the control processes of the first control unit and the second control unit may be executed by an event-driven type process for executing a process in event units. In this case, the processes may be executed in a completely event-driven type, or may be executed by combining the event-driven type and a flow-driven type.

A shift device according to one aspect of this disclosure includes: a shift switching member including a plurality of valley portions corresponding to shift positions; a motor that includes a rotor and a stator and that is configured to drive the shift switching member; a first drive system including a first control unit configured to control a voltage for driving the motor; a second drive system that is provided separately from the first drive system and that includes a second control unit configured to control the voltage for driving the motor; and a positioning member configured to establish the shift positions in a state in which the positioning member is fitted into any one of the plurality of valley portions of the shift switching member. The shift device is configured to acquire the shift positions when the motor is driven by the voltage output from one of the first drive system and the second drive system to move the positioning member such that the positioning member continuously passes through the plurality of valley portions.

In the shift device according to one aspect of this disclosure, as described above, the shift positions are acquired when the motor is driven by the voltage output from one of the first drive system and the second drive system to move the positioning member such that the positioning member continuously passes through the plurality of valley portions. Accordingly, at the time of learning the shift positions by the first control unit and the second control unit, learning of the shift positions is executed by recognizing a position of a detent spring by both the first control unit and the second control unit while controlling the motor by either the first drive system or the second drive system. Therefore, at the time of learning the shift positions, since the voltage is applied to the motor only from either the first control unit or the second control unit, it is possible to prevent control of the motor executed by the first control unit and control of the motor executed by the second control unit from interfering with each other. As a result, since the control of the motor executed by the first control unit and the control of the motor executed by the second control unit can be prevented from interfering with each other, it is possible to prevent the learning of the shift positions of the first control unit and the learning of the shift positions of the second control unit from being hindered. Even when one of the first control unit and the second control unit is abnormal, drive control of the motor can be continued using the other control unit, and thus it is possible to guarantee that the drive control of the motor is continued.

In the shift device according to the above aspect, it is preferable that, when the motor is driven by the voltage output from one of the first drive system and the second drive system to move the positioning member such that the positioning member continuously passes through the plurality of valley portions, the movement of the positioning member due to the driving of the motor by the voltage output from one of the first drive system and the second drive system is stopped for a predetermined time on the basis that the positioning member is disposed in a section of each of valley bottoms of the plurality of valley portions.

According to this configuration, by stopping the movement of the positioning member for the predetermined time on the basis that the positioning member is disposed in the section of each of the valley bottoms of the plurality of valley portions, it is possible to eliminate a vibration caused by the driving of the motor and a deviation between an actual position of the positioning member and a measured position of the positioning member, and thus it is possible to prevent deterioration of measurement accuracy of a position of the positioning member caused by the above vibration and the above deviation.

In this case, it is preferable that the motor is re-driven by outputting the voltage again from one of the first drive system and the second drive system on the basis that the movement of the positioning member is stopped for the predetermined time.

According to this configuration, since the movement of the positioning member is stopped for the predetermined time and then the positioning member is re-driven, it is possible to learn a position of each of the valley bottoms of the plurality of valley portions in a static state, and thus it is possible to learn the shift positions with high accuracy.

In the shift device that re-drives the motor, it is preferable that the first control unit and the second control unit are communicable with each other, and the first control unit and the second control unit communicate with each other so that one of the first drive system and the second drive system that outputs the voltage determines a timing of re-driving the motor.

According to this configuration, it is possible to change the timing at which the motor is re-driven by one of the first drive system and the second drive system according to a control cycle of the other drive system that does not output the voltage, and thus it is possible to re-drive the motor in a state in which the first control unit and the second control unit are synchronized.

In the shift device according to the above aspect, it is preferable that the first control unit and the second control unit are communicable with each other, and one of the first drive system and the second drive system that outputs the voltage erases the acquired shift positions corresponding to the plurality of valley portions when the first control unit and the second control unit communicate with each other, so that it is detected that at least one of the shift positions corresponding to the plurality of valley portions is not acquired in the other drive system.

According to this configuration, since the shift positions acquired in one drive system is erased when the acquisition of the shift position in the other drive system fails, it is possible to prevent the shift switching member from being driven using only one drive system, and thus it is possible to prevent a shift device that drives only one of the first drive system and the second drive system from being manufactured.

In the shift device according to the above aspect, it is preferable that the shift device further includes a first motor rotation angle sensor and a second motor rotation angle sensor that are configured to measure a rotation angle of the motor, and a first output shaft sensor and a second output shaft sensor that are configured to measure a rotation angle of an output shaft connected to the shift switching member, and that the first control unit executes control for acquiring the shift positions based on measurement values of the first motor rotation angle sensor and the first output shaft sensor and the second control unit executes control for acquiring the shift positions based on measurement values of the second motor rotation angle sensor and the second output shaft sensor.

According to this configuration, when the motor is driven by the voltage output from one of the drive systems to move the positioning member such that the positioning member continuously passes through the plurality of valley portions, each of the first control unit and the second control unit can acquire the shift positions in parallel, and thus it is possible to efficiently acquire the shift positions as compared with a case in which the acquisition of the shift positions executed by the first control unit and the acquisition of the shift positions executed by the second control unit are executed separately from each other.

The shift device according to the above aspect may have the following configurations.

Appendix 1

That is, the shift device further includes a driving force transmission mechanism that includes the output shaft connected to the shift switching member and that transmits a driving force from the motor to the shift switching member, the first motor rotation angle sensor and the second motor rotation angle sensor that measure the rotation angle of the motor, and the first output shaft sensor and the second output shaft sensor that measure the rotation angle of the output shaft. At the time of acquiring the shift positions, the motor is driven by the first drive system based on the measurement values of the first motor rotation angle sensor and the first output shaft sensor, or the motor is driven by the second drive system based on the measurement values of the second motor rotation angle sensor and the second output shaft sensor.

According to this configuration, since each of the first drive system and the second drive system can independently execute control for driving the motor, even when one of the first drive system and the second drive system is abnormal, the drive control of the motor can be continued using the other drive system.

Appendix 2

In the shift device according to the above aspect, the first control unit and the second control unit are communicable with each other, and one of the first drive system and the second drive system that outputs the voltage controls the driving of the motor based on a communication result from the other drive system.

According to this configuration, the driving of the motor is controlled according to a deviation between a control cycle of the first control unit and a control cycle of the second control unit, so that the above deviation can be eliminated. Therefore, the first control unit and the second control unit can be synchronized.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A shift device comprising:
a shift switching member including a plurality of valley portions corresponding to shift positions;
a motor that includes a rotor and a stator and that is configured to drive the shift switching member;
a first drive system including a first control unit configured to control a voltage for driving the motor;
a second drive system that is provided separately from the first drive system and that includes a second control unit configured to control a voltage for driving the motor; and
a positioning member configured to establish the shift positions in a state in which the positioning member is fitted into any one of the plurality of valley portions of the shift switching member, wherein
the shift device is configured to determine the shift positions as the motor is driven by the voltage output from only one of the first drive system and the second drive system to move the positioning member such that the positioning member continuously passes through the plurality of valley portions.

2. The shift device according to claim 1, wherein
when the motor is driven by the voltage output from one of the first drive system and the second drive system to move the positioning member such that the positioning member continuously passes through the plurality of valley portions, the movement of the positioning member due to the driving of the motor by the voltage output from one of the first drive system and the second drive system is stopped for a predetermined time on the basis that the positioning member is disposed in a section of each of valley bottoms of the plurality of valley portions.

3. The shift device according to claim 2, wherein
the motor is re-driven by outputting the voltage again from one of the first drive system and the second drive system on the basis that the movement of the positioning member is stopped for the predetermined time.

4. The shift device according to claim 3, wherein
the first control unit and the second control unit are communicable with each other, and
the first control unit and the second control unit communicate with each other so that one of the first drive system and the second drive system that outputs the voltage determines a timing of re-driving the motor.

5. The shift device according to claim 1, wherein
the first control unit and the second control unit are communicable with each other, and
one of the first drive system and the second drive system that outputs the voltage erases the acquired shift positions corresponding to the plurality of valley portions when the first control unit and the second control unit communicate with each other, based on a detection that at least one of the shift positions corresponding to the plurality of valley portions is not acquired in the other drive system.

6. The shift device according to claim 1, further comprising:
- a first motor rotation angle sensor and a second motor rotation angle sensor that are configured to measure a rotation angle of the motor; and
- a first output shaft sensor and a second output shaft sensor that are configured to measure a rotation angle of an output shaft connected to the shift switching member, wherein
- the first control unit executes control for acquiring the shift positions based on measurement values of the first motor rotation angle sensor and the first output shaft sensor, and the second control unit executes control for acquiring the shift positions based on measurement values of the second motor rotation angle sensor and the second output shaft sensor.

* * * * *